US012224911B2

(12) United States Patent
Dreyer et al.

(10) Patent No.: US 12,224,911 B2
(45) Date of Patent: Feb. 11, 2025

(54) ENHANCED NETWORK AUTOMATION

(71) Applicant: Level 3 Communications, LLC, Broomfield, CO (US)

(72) Inventors: Bryan Dreyer, Bellevue, WA (US); Jason Nault, Issaquah, WA (US); William Roemhild, Sumner, WA (US); Brent Smith, Arvada, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

(21) Appl. No.: 18/455,409

(22) Filed: Aug. 24, 2023

(65) Prior Publication Data

US 2024/0073101 A1 Feb. 29, 2024

Related U.S. Application Data

(60) Provisional application No. 63/373,547, filed on Aug. 25, 2022.

(51) Int. Cl.
*H04L 41/12* (2022.01)
*H04L 41/16* (2022.01)
(52) U.S. Cl.
CPC .............. *H04L 41/12* (2013.01); *H04L 41/16* (2013.01)
(58) Field of Classification Search
CPC .......... H04L 41/12; H04L 41/16; H04L 43/50
See application file for complete search history.

(56) References Cited

U.S. PATENT DOCUMENTS

| | | | | |
|---|---|---|---|---|
| 10,397,273 | B1* | 8/2019 | Stickle | H04L 63/1491 |
| 2008/0222065 | A1* | 9/2008 | Kedrowski | G06N 3/08 |
| | | | | 706/19 |
| 2011/0243072 | A1* | 10/2011 | Omar | H04W 72/044 |
| | | | | 370/329 |
| 2015/0372873 | A1* | 12/2015 | Mahadevan | H04L 41/12 |
| | | | | 370/255 |
| 2019/0007277 | A1* | 1/2019 | Misra | H04L 41/145 |
| 2022/0239564 | A1* | 7/2022 | Jiang | G06N 7/01 |

* cited by examiner

*Primary Examiner* — Gil H. Lee

(57) ABSTRACT

This disclosure describes systems, methods, and devices related to automating and testing communication network topologies. A method may include identifying templates of respective communication network topologies defining network devices, connections between the network devices, roles for the network devices, and performance tests for the communication network topologies; selecting a first template; instantiating an instance to generate a first communication network topology by establishing first connections between first network devices based on the first communication network topology and first roles of first network devices of the first communication network topology; generating performance test results for the first communication network topology based on performance of first performance tests defined by the first template, wherein first test thresholds of the first performance tests are based on a machine learning model trained based on the communication network topologies and the performance tests; and modifying the first test thresholds based on the performance test results.

20 Claims, 6 Drawing Sheets

ENHANCED NETWORK AUTOMATION

CROSS-REFERENCE TO RELATED APPLICATION

This application is related to an claims priority under 35 U.S.C. § 119(e) from U.S. Patent Application No. 63/373,547, filed Aug. 25, 2022, titled "ENHANCED NETWORK AUTOMATION," the entire content of which is incorporated herein by reference for all purposes.

TECHNICAL FIELD

Embodiments of the present invention generally relate to systems and methods for automating changes to and testing of communications networks.

BACKGROUND

Some communications networks use a single-vender homogenous edge computing infrastructure in which adding or modifying a network device stack may require physically moving or re-cabling network and compute hardware. Configuring and deploying network devices may require connecting devices of one vender with network devices of another vender and performing various tests, but the physical connecting and configuring of the devices may be time-consuming and inefficient.

SUMMARY

One aspect of the present disclosure includes automating the establishment of network hardware infrastructure, including dedicated connection switching hardware, allowing for moving of network hardware topologies without physically moving or re-cabling network and compute hardware. A method may include identifying templates defining respective communication network topologies defining network devices, connections between the network devices, roles associated with the network devices, and performance tests for the communication network topologies. The method may include selecting a first template of the templates. The method may include instantiating, based on the selection of the first template, an instance associated with generating a first communication network topology by establishing first connections between first network devices based on the first communication network topology and first roles associated with first network devices of the first communication network topology. The method may include generating performance test results for the first communication network topology based on performance of first performance tests defined by the first template, wherein first test thresholds of the first performance tests are based on a machine learning model trained based on the communication network topologies and the performance tests. The method may include modifying, using the machine learning model, the first test thresholds based on the performance test results.

A system may include one or more devices with processors and memory to identify templates defining respective communication network topologies defining network devices, connections between the network devices, roles associated with the network devices, and performance tests for the communication network topologies. The system may select a first template of the templates. The system may instantiate, based on the selection of the first template, an instance associated with generating a first communication network topology by establishing first connections between first network devices based on the first communication network topology and first roles associated with first network devices of the first communication network topology. The system may generate performance test results for the first communication network topology based on performance of first performance tests defined by the first template, wherein first test thresholds of the first performance tests are based on a machine learning model trained based on the communication network topologies and the performance tests. The system may modify, using the machine learning model, the first test thresholds based on the performance test results.

A device may include one or more processors and memory to identify templates defining respective communication network topologies defining network devices, connections between the network devices, roles associated with the network devices, and performance tests for the communication network topologies. The device may select a first template of the templates. The device may instantiate, based on the selection of the first template, an instance associated with generating a first communication network topology by establishing first connections between first network devices based on the first communication network topology and first roles associated with first network devices of the first communication network topology. The device may generate performance test results for the first communication network topology based on performance of first performance tests defined by the first template, wherein first test thresholds of the first performance tests are based on a machine learning model trained based on the communication network topologies and the performance tests. The device may modify, using the machine learning model, the first test thresholds based on the performance test results.

Figure 1:
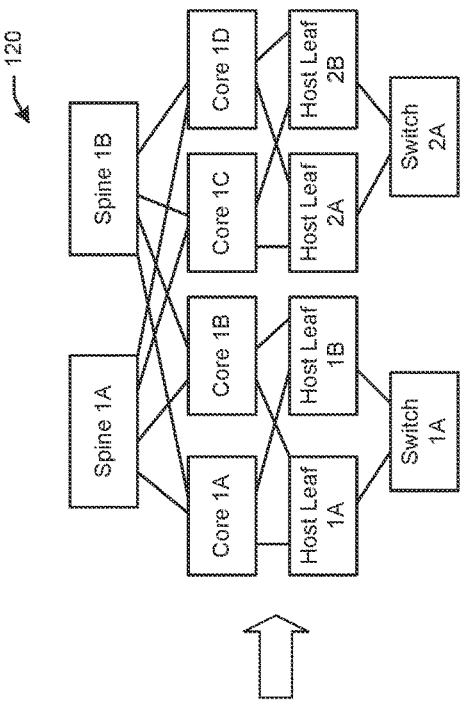
FIG. 1 illustrates an example process for selecting and generating a communications network topology in accordance with one embodiment.
Figure 1:
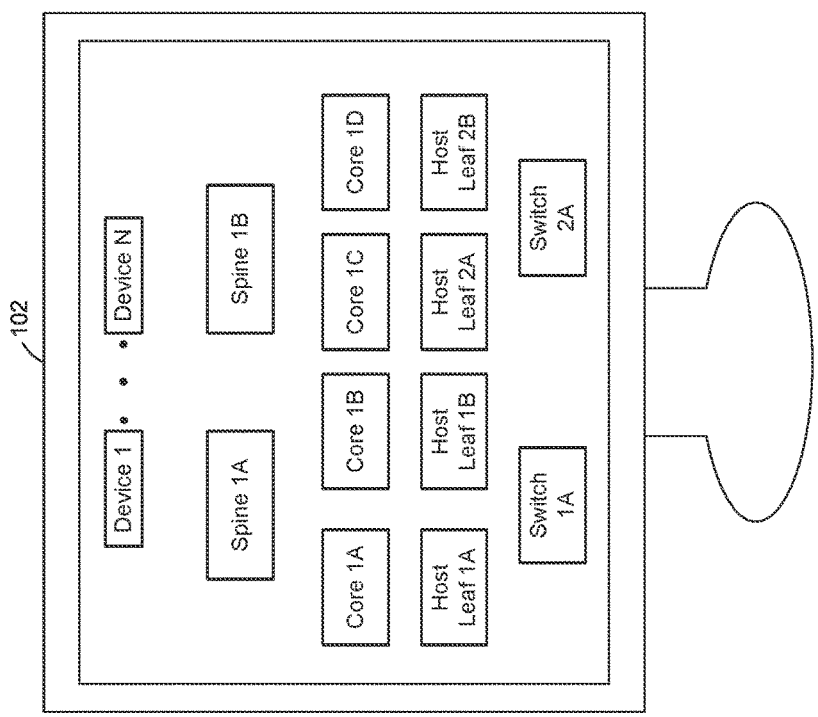

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Aspects of the present disclosure involve systems, methods, and the like, for automating changes to and testing of communications networks.

Telecommunications networks may provide many services to customers or devices connected to the network, including transmission of communications between network devices, network services, remote computing environments, cloud services (such as storage services, networking service, compute services, etc.), and the like. Such telecommunications networks generally include interconnected devices and/or components that are configured to communicate with each other and/or customer devices to provide access to the available services from the network.

Typically, configuration of devices and interconnections of the network require a network engineer to remotely or locally access network components and manually configure settings, ports, operating systems, and the like to enable the network to provide services to customers. In some instances, the configuration of network devices includes multiple network administrators and other groups to manually configure the devices. For example, configuration of some network services may require a first network administrator to log into one or more components associated with the services separately after installation of the components into the network and provide one or more inputs via a workstation or other computing device to configure the components according to a service plan as a single step in the overall service configuration process. The first network administrator may then notify another group or administrator of the completion of a step in the configuration process so that the next step in the process may be executed by the second network administrator, and so on. Such a process can be time consuming, require steps or acts from multiple network groups, and includes multiple potential points of delay or errors that must be identified and corrected before the network service is available to the customer.

When a user wants to generate a new network topology, or move a network topology (e.g., a full or mixed network device stack), the user may need to physically move and re-cable the network hardware (e.g., connect devices), update firmware and device configurations, and test for performance of the topology. For example, a network topology may require manually plugging in devices of one vender to devices of another vender to test the devices and the performance of the topology. Such connecting and testing may be inefficient.

One aspect of the present disclosure is to automate the hardware infrastructure, including dedicated connection switching hardware, allowing for more efficient moving of network hardware topologies without having to physically move or re-cable network and compute hardware. A user may be able to generate a set of network topologies based on existing set-ups, and then test the topologies and make adjustments to their connections and configurations to ensure quality of service compliance.

One aspect of the present disclosure is to automate network topology changes. By using templates of common/popular topologies with predefined roles and connections, users may be able to select a template to implement as a topology. The templates also may define tests to be performed, layers, host leafs, optical switches, interface connections, and the like for various topologies that, when selected, may result in the automatic configuration and testing of a topology. For example, a topology may have a stack that includes only devices of a single vender, but a user may want to implement the same topology with devices of a different vender. The templates may allow for testing the topology and its configurations with the devices of the different vender (e.g., as the topology and its configuration for one set of network devices may not perform the exact same for a different set of network devices). Rather than having to select and add individual devices and determine and implement their configurations, selection of a template allows a user to select a pre-defined topology configuration and set of tests for the topology.

One aspect of the present disclosure is to automate firmware versions and configuration changes. Another aspect of the present disclosure is to automate test cases, including functional, performance, and the like. The templates may define the test criteria for different topologies and device types. Another aspect of the disclosure is to automate and store the baseline results of topology tests. Network equipment, servers, services running on servers, and the like, all may be tested.

One aspect of the disclosure is to use machine learning to distill the results of the results of the topology tests performed based on the templates. Machine learning models may set performance baselines based on test cases and performance results, allowing for determinations of system performance at a current time compared to past performance, reasons for differences, and recommendations for adjustments. For example, when a generated topology meets performance criteria defined by the templates, the topology may be implemented. However, when a generated topology does not meet performance criteria defined by the templates, the machine learning models may generate recommendations for adjusting connections and/or configurations. The machine learning models may adjust performance baselines based on performance results so that performance testing results are more likely to be indicative of performance once a topology is implemented. For example, the machine learning models may set a performance baseline, compare the performance results to the performance baseline, and adjust the performance baseline based on how much the performance results vary from the performance baseline.

One aspect of the disclosure is to generate a zero-touch process in which selecting a topology generates an instance that may define the specific connections between devices (e.g., how each interface of a device connects to ports of the devices). For example, U.S. Patent Application Pub. No. 2022/0038340 to Dreyer et al., is hereby incorporated by reference in its entirety.

One aspect of the disclosure is to provide a user interface with which to select spines, core layers, host leafs, switches, and the like to include in a network topology. The devices may be from a single vender or multiple venders (e.g., mixed). The user interface may allow users to add network devices to a topology and configure a device map file (e.g., a .csv file) based on templates for existing topologies. A template may define map file attributes that a user may accept or modify, including a device hostname, a device identifier, a user identifier (e.g., list of registered users), and the like. The user interface may present the hostname of any network device in a topology, its operating system, management address, validation status, connections, performance metrics, and the like. For example, the user interface may present any network devices interfaces and their hostnames, circuit identifiers, and the like. For any port configuration, the user interface may allow a user to select configurations to apply, such as available port configurations, bare metal server chassis nodes, storage grid administrative nodes, unused channelized ports, and the like.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example process 100 selecting and generating a communications network topology in accordance with one embodiment.

Referring to FIG. 1, a device 102 may present a user interface that allows a user to select from among multiple network devices (e.g., device 1, . . . , device N as shown) from multiple venders/manufacturers to be included in a network topology. As shown the devices in the network topology may include spines, core devices, host leaf devices, switches, and the like. The user may select which devices may be used for the different types of devices (e.g., device roles) in the network topology. The network topology may be based on a template of multiple templates that may be generated (e.g., based on currently used network topologies, commonly used network topologies, preferred network topologies, etc.). The templates may define the devices and their roles, connections, configurations, tests and test parameters/criteria, and the like. When the user selects a template, the topology may be presented, and the user may select the devices to use in the topology.

Still referring to FIG. 1, when the user generates a topology, the device 102 may instantiate an instance that automates the generation of the topology, including the device arrangement, connections, configurations, and the like, and that performs testing on the topology to determine whether the selected devices, roles, and configuration of the topology satisfy performance criteria. The baselines (e.g., thresholds) for the testing parameters/criteria may be set based on a machine learning model (e.g., the ML model 611 of FIG. 6), which may be trained based on test cases and performance results, and may update the baselines based on actual performance test results for a topology.

Figure 2:
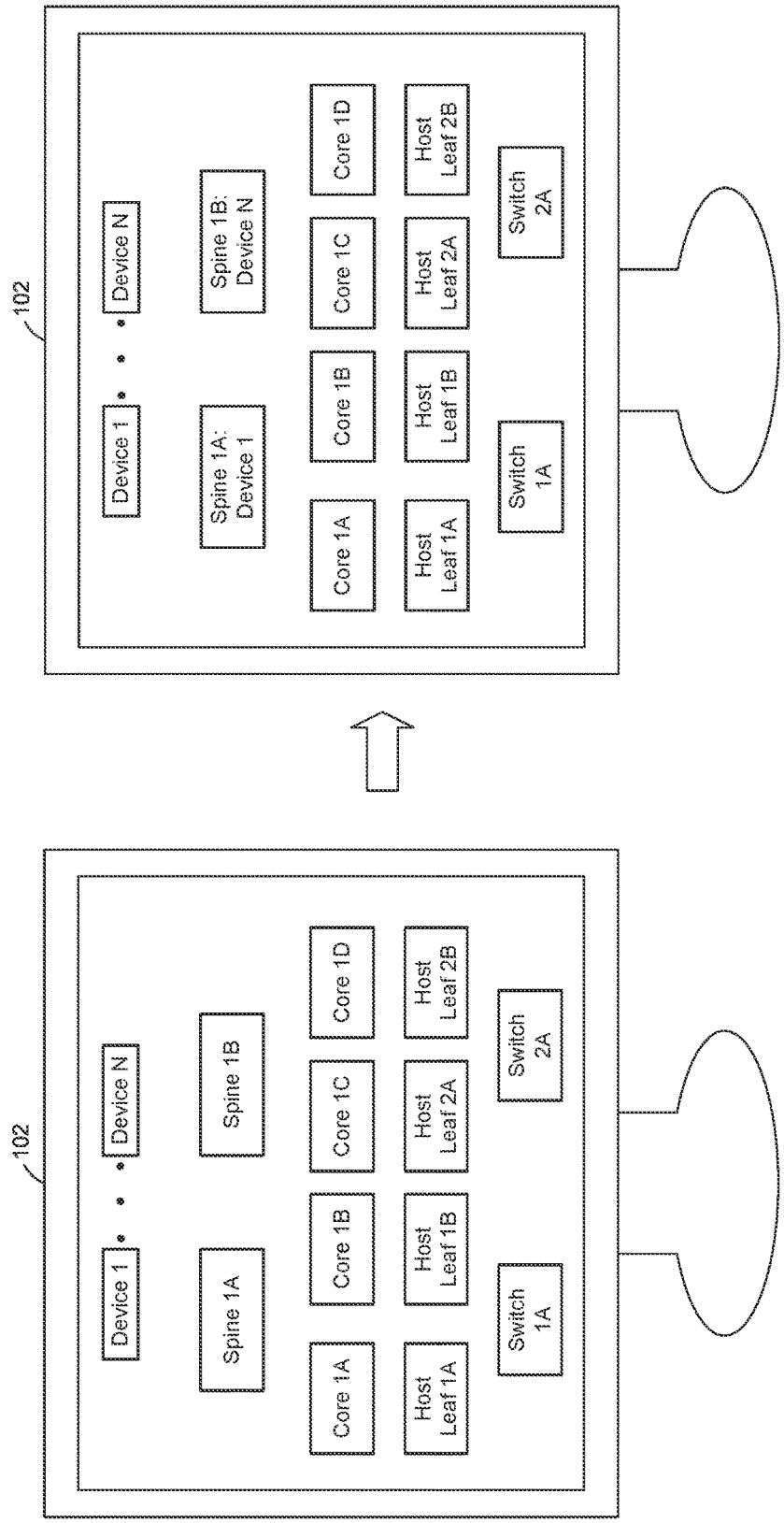
FIG. 2 illustrates an example user interface for selecting and generating a communications network topology in accordance with one embodiment.
Figure 3:
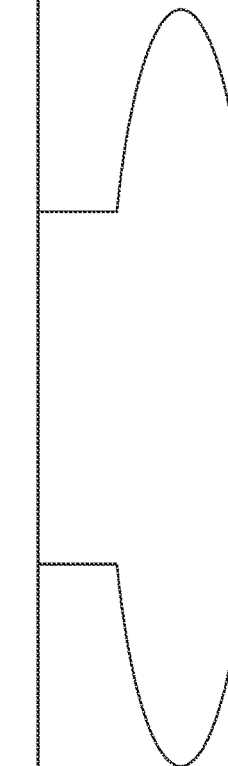
FIG. 3 illustrates an example user interface for testing a communications network topology in accordance with one embodiment.
Figure 4:
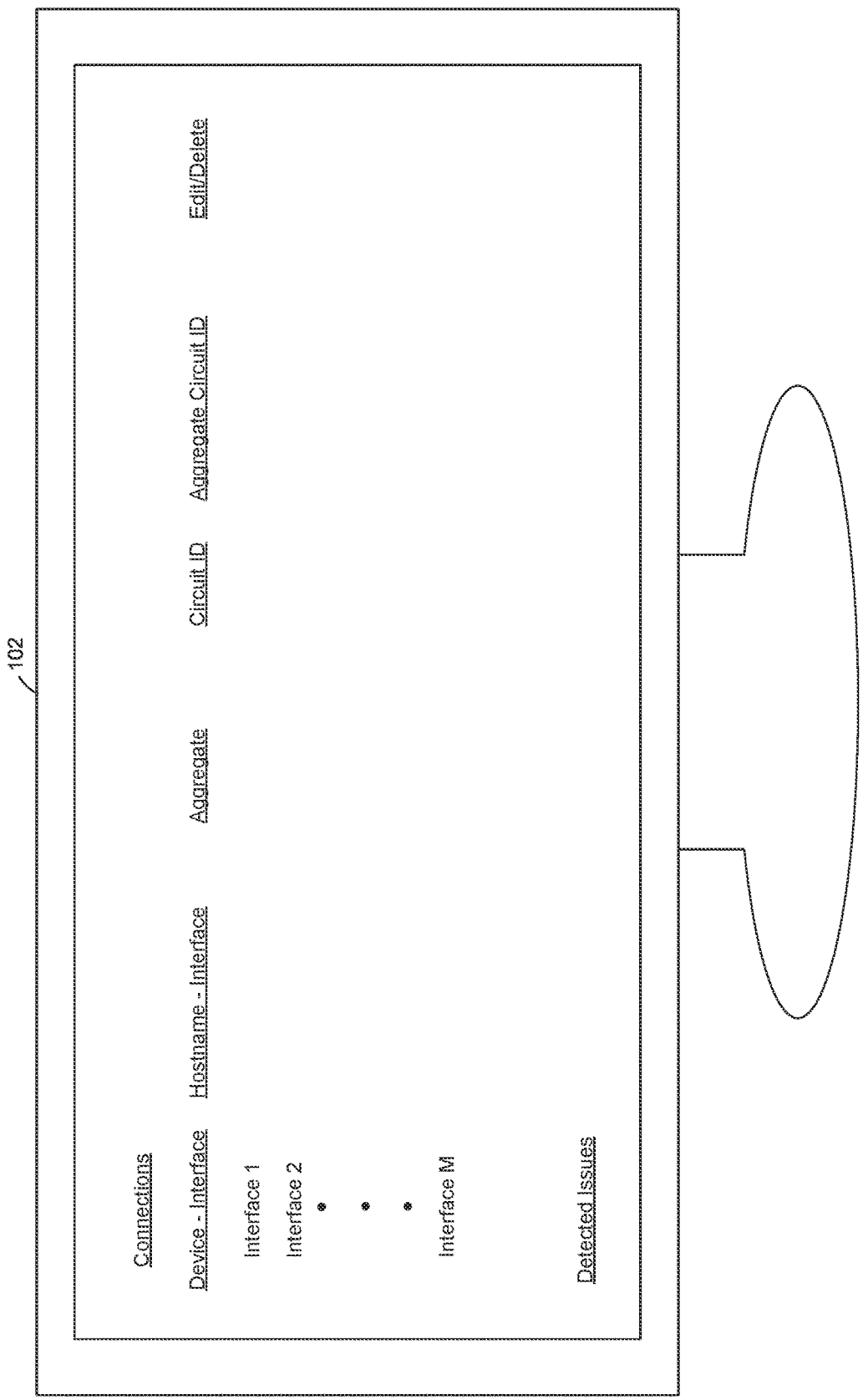
FIG. 4 illustrates an example user interface for testing a communications network topology in accordance with one embodiment.

For example, a topology defined by a template may include devices all of one manufacturer/vender, or of mixed manufacturers/venders. The topology generated by the user may include devices of one or more different manufacturers/venders, so the performance results may not be the same, as not all devices use the same configurations or connect in the same manner. By using dedicated switching hardware, an existing network topology may be moved without physically moving or re-cabling the network and compute hardware. The template may allow for topology changes, which may result in new templates (e.g., defining new topologies and/or performance test criteria/parameters). Using the machine learning-defined performance tests, the device 102 may present results of the performance tests (e.g., as shown in FIGS. 2-4), allowing a user to further configure the network topologies based on the performance results of the tests. Other outputs of the machine learning may include indications of performance at a current time, comparison of performance results with previous performance results, explanations for performance results, and recommendations (e.g., regarding device types, roles, connections, configurations, and the like) to improve performance of the topology.

In another example, the automated system may allow for switching between topologies and testing instances. When a topology uses devices all of one manufacturer, and a user wants to test a topology with devices all of another manufacturer, the user may want to validate the first topology to identify any performance issues. In this manner, a user generating a topology of devices of one manufacturer may test a topology using devices of another manufacturer without having to physically connect and configure the devices.

FIG. 2 illustrates an example user interface 200 for selecting and generating a communications network topology in accordance with one embodiment.

Referring to FIG. 2, the device 102 shows an interface 200 that allows a user to select from among multiple network devices. In addition to the topology selection in FIG. 1, the intermediate step of selecting the available devices (e.g., device 1, . . . , device N) for the various roles in the topology also is shown, allowing a user to select stacks that are only of one manufacturer/vendor, or mixed stacks. The template may define existing topologies from which a user may select, and the user may add, delete, or change which devices are used in the topology, their connections with one another, the configurations, and their testing.

FIG. 3 illustrates an example user interface 300 for testing a communications network topology in accordance with one embodiment.

Referring to FIG. 3, the device 102 shows the user interface 300, which may present the devices' hostnames, operating systems (OS), management addresses, validation, status, certificate of authenticity (COA), original equipment manufacturer (OEM) activation (OA), and edit/delete options for the particular device hostname. The user interface 300 also may allow a user to select other information, such as connections and detected issues (e.g., from testing). In this manner, the user interface 300 may allow a user to see the progress and test results of performance tests of a topology.

FIG. 4 illustrates an example user interface 400 for testing a communications network topology in accordance with one embodiment.

Referring to FIG. 4, the device 102 shows the user interface 400, which may present the devices' interfaces, hostname interfaces, aggregate number, circuit identifier, aggregate circuit identifier, and edit/delete options for the particular device interfaces.

Figure 5:
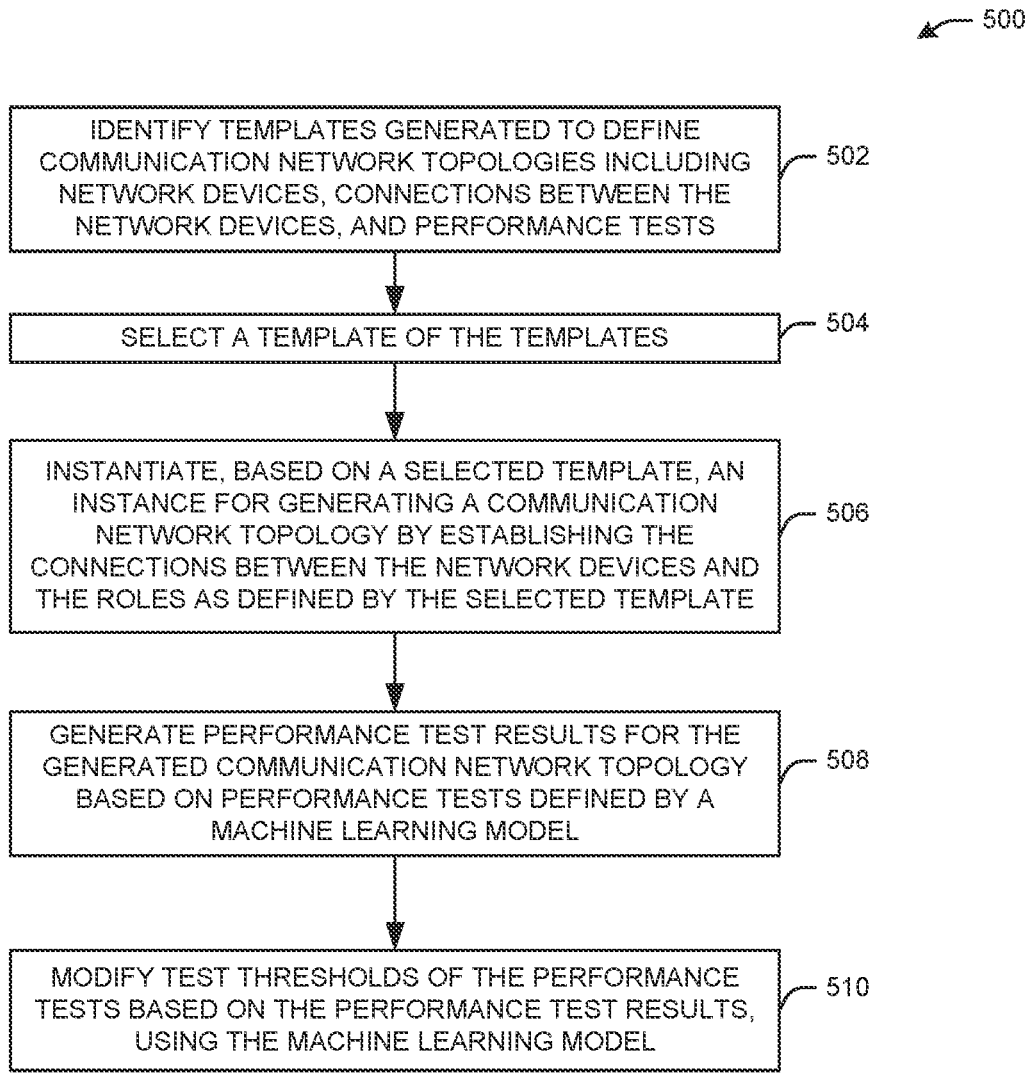
FIG. 5 is a flow chart of an example process for automating changes to and testing of communications networks in accordance with one embodiment.

FIG. 5 is a flow chart of an example process 500 for automating changes to and testing of communications networks in accordance with one embodiment.

At block 502, a device (or system, e.g., the device 102 of FIG. 1, the topology devices 609 of FIG. 6) may identify templates, which the device may have generated based on existing topologies. The templates may define topologies, include network devices, their roles and connections, their configurations, and their test parameters/criteria. The topologies may be previously generated and tested, and may be available for implementation and/or modification. For example, a user may select a template to modify or move the topology of the template, to test a new topology, or to connect to a topology of another template.

At block 504, the device may select one of the templates (e.g., using one of the user interfaces of FIGS. 1 and 2). The selection of the template may include selecting devices for the various roles of the template, including spines, core layers, switches, host leaf devices, and the like. The selection may include a full stack from a single manufacturer or a mixed stack.

At block 506, the device may instantiate, based on the selected template, an instance for generating a network topology. The instantiation may automate the creation of the topology, including its connections and configurations as defined by the selected topology. By using templates of common/popular topologies with predefined roles and connections, users may be able to select a template to implement as a topology. The templates also may define tests to be performed, layers, host leafs, optical switches, interface connections, and the like for various topologies that, when selected, may result in the automatic configuration and testing of a topology. For example, a topology may have a stack that includes only devices of a single vender, but a user may want to implement the same topology with devices of a different vender. The templates may allow for testing the topology and its configurations with the devices of the different vender (e.g., as the topology and its configuration for one set of network devices may not perform the exact same for a different set of network devices). The instantiation may automate the generation of the topology of the template, including the device arrangement, connections, configurations, and the like, and that performs testing on the topology to determine whether the selected devices, roles, and configuration of the topology satisfy performance criteria. The instantiation may provide a zero-touch provisioning of the components of the topology and the connections, port assignments, and the like. The device may access and configure the network devices of the topology.

At block 508, the device may generate performance test results for the topology based on the performance of tests defined by a machine learning model. The tests may be included in the template for a given topology, and based on the baselines set by the machine learning model, which may learn the baselines based on test cases and performance results of other topologies.

At block 510, the device may modify test thresholds of the performance tests in the template based on the performance test results. The machine learning model may use the test results as feedback to determine whether a topology performed as expected. When test results deviate from expected values (e.g., the baselines), the machine learning model may update the baselines for a given topology.

It is understood that the above descriptions are for purposes of illustration and are not meant to be limiting.

Figure 6:
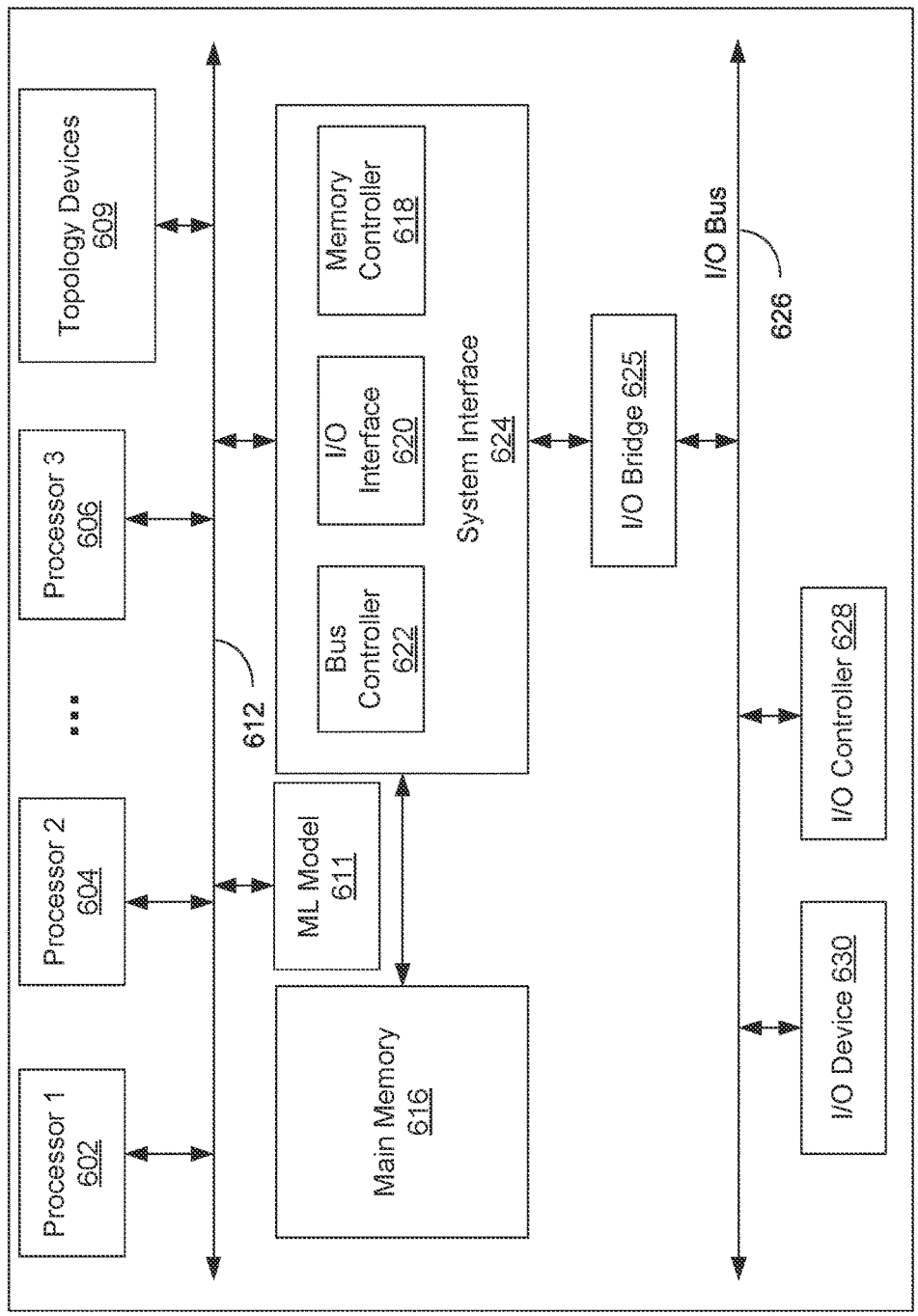
FIG. 6 is a diagram illustrating an example of a computing system that may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 5 may represent at least a portion of the device 102 shown in FIG. 1 and/or a device/system remote from the device 102 (not shown, e.g., a cloud-based system). The computer system (system) includes one or more processors 602-606, one or more topology devices 609, and a ML model 611. Processors 602-606 may include one or more internal levels of cache (not shown) and a bus controller 622 or bus interface unit to direct interaction with the processor bus 612. Processor bus 612, also known as the host bus or the front side bus, may be used to couple the processors 602-606 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for automating and testing communication network topologies, the method comprising:
   identifying, by at least one processor of a device, templates comprising respective communication network topologies defining network devices, connections between the network devices, roles associated with the network devices, and performance tests for the communication network topologies;
   selecting, by the at least one processor, a first template of the templates;
   instantiating, by the at least one processor, based on the selection of the first template, an instance associated with generating a first communication network topology by establishing first connections between first network devices based on the first communication network topology and first roles associated with first network devices of the first communication network topology;
   generating, by the at least one processor, performance test results for the first communication network topology based on performance of first performance tests defined by the first template;
   determining, by the at least one processor, that the first communication network topology satisfies one or more performance criteria based on the generated performance test results; and
   displaying, by the at least one processor and on a display device, the determination that the first communication network topology satisfies the one or more performance criteria,
   wherein first test thresholds of the first performance tests are based on a machine learning model trained based on the communication network topologies and the performance tests.

2. The method of claim 1, the method further comprising:
   modifying, using the machine learning model, the first test thresholds based on the performance test results.

3. The method of claim 1, wherein the first network devices are all of a first manufacturer, wherein the first communication network topology defines a second communication network topology using second network devices all of a second manufacturer different than the first manufacturer.

4. The method of claim 1, wherein the first roles comprise a switch, a spine, a core layer, and a host leaf.

5. The method of claim 1, wherein instantiating is associated with selecting firmware versions for the first network devices.

6. The method of claim 1, wherein instantiating is associated with establishing services to execute using the first network devices.

7. The method of claim 6, wherein the performance test results are indicative of first performance of the first network devices and second performance of the services.

8. The method of claim 1, further comprising:
   selecting a second template of the templates;
   instantiating, based on the selection of the second template, a second instance associated with generating a second communication network topology by establishing second connections between second network devices based on the second communication network topology and second roles associated with second network devices of the second communication network topology; and
   generating second performance test results for the second communication network topology based on performance of second performance tests defined by the second template.

9. The method of claim 8, wherein the second network devices comprise devices of a first manufacturer and devices of a second manufacturer.

10. A system for automating and testing communication network topologies, the system comprising:
    at least one processor coupled to memory, wherein the at least one processor is configured to:
    identify templates comprising respective communication network topologies defining network devices, connections between the network devices, roles associated with the network devices, and performance tests for the communication network topologies;
    select a first template of the templates;
    instantiate, based on the selection of the first template, an instance associated with generating a first communication network topology by establishing first connections between first network devices based on the first communication network topology and first roles associated with first network devices of the first communication network topology;
    generate performance test results for the first communication network topology based on performance of first performance tests defined by the first template;
    determine that the first communication network topology satisfies one or more performance criteria based on the generated performance test results; and
    display, on a display device, the determination that the first communication network topology satisfies the one or more performance criteria,
    wherein first test thresholds of the first performance tests are based on a machine learning model trained based on the communication network topologies and the performance tests.

11. The system of claim 10, wherein the at least one processor is further configured to:
    modify, using the machine learning model, the first test thresholds based on the performance test results.

12. The system of claim 10, wherein the first roles comprise a switch, a spine, a core layer, and a host leaf.

13. The system of claim 10, wherein to instantiate is associated with selecting firmware versions for the first network devices.

14. The system of claim 10, wherein to instantiate is associated with establishing services to execute using the first network devices.

15. The system of claim 14, wherein the performance test results are indicative of first performance of the first network devices and second performance of the services.

16. The system of claim 10, wherein the at least one processor is further configured to:
select a second template of the templates;
instantiate, based on the selection of the second template, a second instance associated with generating a second communication network topology by establishing second connections between second network devices based on the second communication network topology and second roles associated with second network devices of the second communication network topology; and
generate second performance test results for the second communication network topology based on performance of second performance tests defined by the second template.

17. A device for automating and testing communication network topologies, the device comprising at least one processor coupled to memory, the at least one processor configured to:
identify templates comprising respective communication network topologies defining network devices, connections between the network devices, roles associated with the network devices, and performance tests for the communication network topologies;
select a first template of the templates;
instantiate, based on the selection of the first template, an instance associated with generating a first communication network topology by establishing first connections between first network devices based on the first communication network topology and first roles associated with first network devices of the first communication network topology;
generate performance test results for the first communication network topology based on performance of first performance tests defined by the first template;
determine that the first communication network topology satisfies one or more performance criteria based on the generated performance test results; and
display, on a display device, the determination that the first communication network topology satisfies the one or more performance criteria,
wherein first test thresholds of the first performance tests are based on a machine learning model trained based on the communication network topologies and the performance tests.

18. The device of claim 17, wherein the at least one processor is further configured to:
modify, using the machine learning model, the first test thresholds based on the performance test results.

19. The device of claim 17, wherein the first roles comprise a switch, a spine, a core layer, and a host leaf.

20. The device of claim 17, wherein to instantiate is associated with selecting firmware versions for the first network devices.

* * * * *